(12) United States Patent
Wu et al.

(10) Patent No.: US 8,391,363 B2
(45) Date of Patent: Mar. 5, 2013

(54) METHOD AND APPARATUS FOR MOTION PROJECTION ERROR CONCEALMENT IN BLOCK-BASED VIDEO

(75) Inventors: Zhenyu Wu, Plainsboro, NJ (US); Jill MacDonald Boyce, Manalapan, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1376 days.

(21) Appl. No.: 11/992,702

(22) PCT Filed: Sep. 7, 2006

(86) PCT No.: PCT/US2006/034514
§ 371 (c)(1),
(2), (4) Date: Mar. 27, 2008

(87) PCT Pub. No.: WO2007/040889
PCT Pub. Date: Apr. 12, 2007

(65) Prior Publication Data
US 2010/0166071 A1    Jul. 1, 2010

Related U.S. Application Data

(60) Provisional application No. 60/721,892, filed on Sep. 29, 2005.

(51) Int. Cl.
*H04B 1/66* (2006.01)
*H04N 7/12* (2006.01)
*H04N 11/02* (2006.01)
*H04N 11/04* (2006.01)

(52) U.S. Cl. ......... 375/240.16; 375/240.12; 375/240.01; 375/240

(58) Field of Classification Search ............. 375/240.27, 375/240, 240.01, 240.02, 240.03, 240.04, 375/240.05, 240.12, 240.13, 240.16, 240.25, 375/240.26; 725/86; 709/231, 238
See application file for complete search history.

(56) References Cited

PUBLICATIONS

Bandyopadhyay, "Frame Loss Error COncealment for H.264/AVC", Jul. 2005, ITU-T, all pages.*
Qiang, "Block-Based Temporal Error Concealment for Video Packet Using Motion Vector Extrapolation", 2002, IEEE, all pages.*

* cited by examiner

*Primary Examiner* — Kwang B Yao
*Assistant Examiner* — Adam Duda
(74) *Attorney, Agent, or Firm* — Robert D. Shedd; Guy H. Eriksen

(57) ABSTRACT

There are provided a method and apparatus for block-based error concealment. The apparatus includes an error concealment module for concealing a current block in a lost picture of a video sequence by projecting positions of at least one block in a correctly received picture of the video sequence to a position of the current block in the lost picture using motion vectors of the at least one block in the correctly received picture so as to obtain a resultant projection, and selecting one of the at least one block in the correctly received picture based upon an amount of overlap in the resultant projection. The current block in the lost picture is then concealed using a motion vector of the selected one of the at least one block in the correctly received picture.

12 Claims, 5 Drawing Sheets

METHOD AND APPARATUS FOR MOTION PROJECTION ERROR CONCEALMENT IN BLOCK-BASED VIDEO

CROSS-REFERENCE TO RELATED APPLICATIONS

This application claims the benefit, under 35 U.S.C. §365 of International Application PCT/US2006/034514 filed Sep. 7, 2006, which was published in accordance with PCT Article 21(2) on Apr. 12, 2007 in English and claims priority of U.S. Provisional patent application No. 60/721,892 filed Sep. 29, 2005.

FIELD OF THE INVENTION

The present invention relates generally to video decoding and, more particularly, to a method and apparatus for motion projection error concealment in block-based video.

BACKGROUND OF THE INVENTION

Compressed video content is often subject to channel impairment during transmission. In some applications, corrupted video bitstreams may reach the video decoder. When this happens, the quality of delivered video can degrade severely if no proper action is taken. Error concealment is a technique often used by the video decoder in this case. Error concealment recovers the lost or damaged video information by utilizing the remaining redundancy inside a compressed bitstream.

Slice loss error concealment has been considered and implemented in the prior art. However, at least one slice has to be received for each lost frame in order to apply the error concealment. Therefore, it is not applicable when a video frame is lost entirely. However, in many applications, especially those operating at low bit-rates, such as 3G wireless networks, a coded frame is often encapsulated into a transmit unit. When such a transmit unit is lost during transmission, a corresponding frame is lost. Slice loss error concealment fails in these applications.

There are some existing simple error concealment algorithms that can handle entire frame losses. For example, one technique is "Frame Copy" (FC), which is a scheme that simply performs pixel-by-pixel copy from a given reference frame to reconstruct a lost frame. Frame Copy is effective for stationary video sequences which have little motion. However, for those video sequences which possess active motion, Frame Copy often produces low PSNR values as well as noticeable error propagation.

"Motion Copy" (MC) is another simple error concealment which can conceal a lost frame. Motion Copy copies the motion field of a given reference frame to a lost frame and then performs motion compensation to reconstruct the lost frame. Motion Copy is effective for video sequences which possess homogeneous motion fields, such as those occurring in camera panning. However, Motion Copy can generate concealment artifacts when there is abundant chaotic motion in a video sequence.

Some more sophisticated error concealment algorithms have been proposed to conceal a lost frame. These error concealment algorithms can be generally divided into block-level and pixel-level algorithms. One such pixel-level error concealment algorithm extrapolates the motion vectors (MVs) at each pixel from the last received frame. Then, for each pixel in the current missing frame, the error concealment algorithm estimates its MV by either averaging the MVs of all overlapping macroblock (MBs) or duplicating it from the MV of the same location in the previous frame.

In another such pixel-level error concealment algorithm, motion estimation based on optical flow was proposed. Estimated motion vectors (MVs) are projected onto a missing frame after spatial regularization to avoid excessive discontinuities. Unfilled pixels in the lost frame are then interpolated spatially.

All of the above algorithms operate at pixel-level, which estimate the MV for each pixel and then perform motion compensation. These algorithms generally require changing existing data structures and adding function modules to the existing video decoding diagram. Furthermore, these algorithms require a substantial amount of additional computation. In contrast, there are algorithms that operate at block-level, which estimate the MV for each block. Block-level error concealment algorithms generally require much less complexity or overhead.

In one such block-level error concealment algorithm, for each 16×16 or 4×4 block, the consistency of the MVs falling inside is checked by computing the first and second order moments. However, the block-level error concealment algorithm does not provide a solution for those blocks that fail the check, which compromises performance.

SUMMARY OF THE INVENTION

These and other drawbacks and disadvantages of the prior art are addressed by the present invention, which is directed to a method and apparatus for motion projection error concealment in block-based video.

According to an aspect of the present invention, there is provided an apparatus for block-based error concealment. The apparatus includes an error concealment module for concealing a current block in a lost picture of a video sequence by projecting positions of at least one block in a correctly received picture of the video sequence to a position of the current block in the lost picture using motion vectors of the at least one block in the correctly received picture so as to obtain a resultant projection, and selecting one of the at least one block in the correctly received picture based upon an amount of overlap in the resultant projection. The current block in the lost picture is then concealed using a motion vector of the selected one of the at least one block in the correctly received picture.

According to another aspect of the present invention, there is provided a method for concealing a current block in a lost picture of a video sequence. The method includes projecting positions of at least one block in a correctly received picture of the video sequence to a position of the current block in the lost picture using motion vectors of the at least one block in the correctly received picture so as to obtain a resultant projection. The method also includes selecting one of the at least one block in the correctly received picture based upon an amount of overlap in the resultant projection. The method further includes concealing the current block in the lost picture using a motion vector of the selected one of the at least one block in the correctly received picture.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

Figure 1:
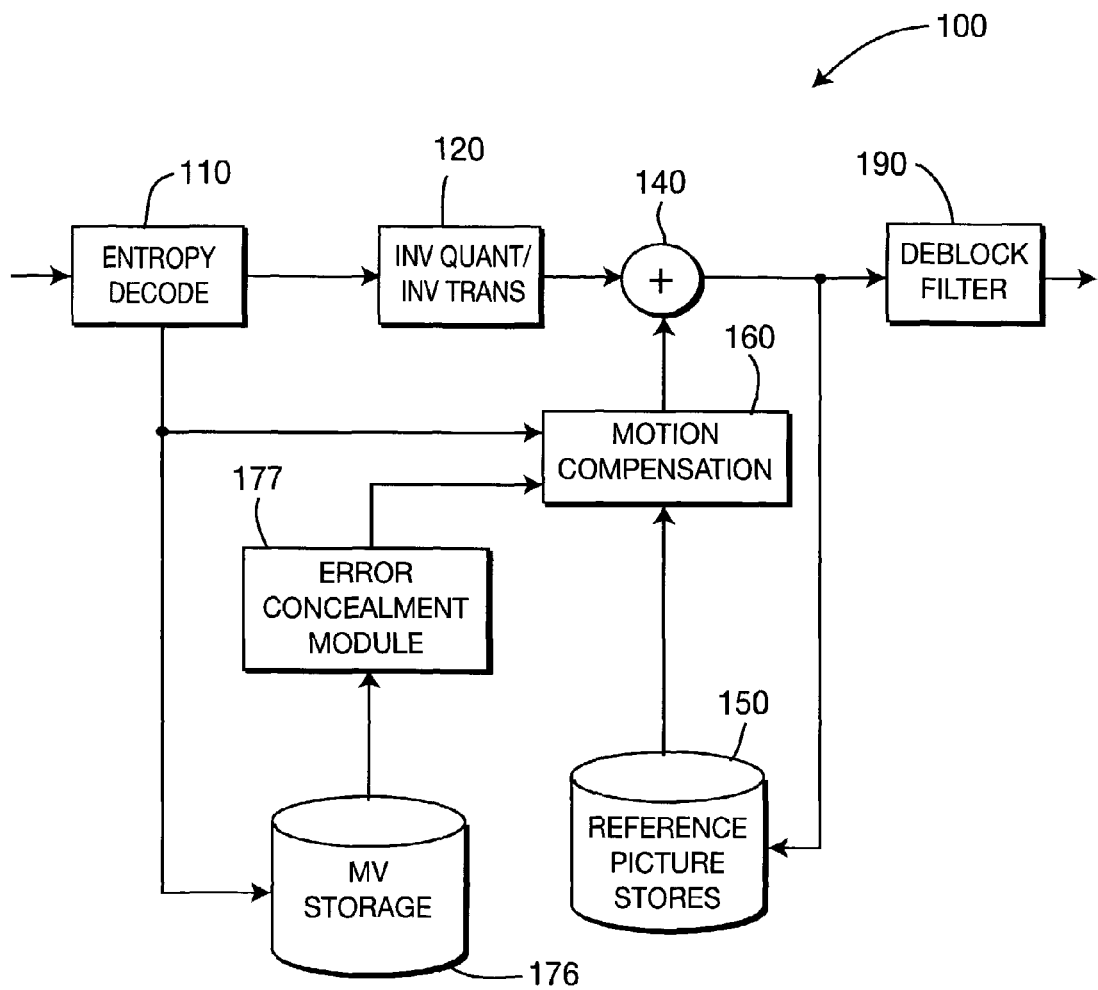
FIG. 1 is a block diagram for an exemplary decoder to which the present principles may be applied, according to an embodiment of the present principles.

The present invention is directed to a method and apparatus for motion projection error concealment in block-based video. For illustrative purposes, the present invention is described herein with respect to a bit stream in compliance with the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 standard (hereinafter the "MPEG4/H.264 standard" or simply the "H.264 standard"). However, it is to be appreciated that the present invention is not limited to solely bit streams in compliance with the H.264 standard and is, thus, equally applicable to other block-based bit streams. Moreover, while the present invention is described herein with respect to image blocks of video frames, it is to be appreciated that the present invention is equally applicable to image blocks of video fields, pictures, slices and the like and, thus, the word "frame" as used herein should be interpreted as being so inclusive. Moreover, the phrase "image structure" is also used herein to collectively denote any of a video frame, field, picture, slice, and so forth. Further, as used herein, the terms "lost" and "missing", when used with respect to an image structure, are also intended to include an image structure that is impaired or otherwise unable to be properly decoded.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Turning to FIG. 1, an exemplary decoder to which the present principles may be applied is indicated generally by the reference numeral 100. The video decoder 100 includes an entropy decoder 110. A first output of the entropy decoder 110 is connected in signal communication with an input of an inverse quantizer/transformer 120. An output of the inverse quantizer/transformer 120 is connected in signal communication with a first input of a summing junction 140.

The output of the summing junction 140 is connected in signal communication with a deblock filter 190. An output of the deblock filter 190 is connected in signal communication with reference picture stores 150. The reference picture store 150 is connected in signal communication with a first input of a motion compensator 160. An output of the motion compensator 160 is connected in signal communication with a second input of the summing junction 140.

A second output of the entropy decoder 110 is connected in signal communication with an input of a motion vector (MV) store 176 and a second input of the motion compensator 160. An output of the motion vector store 176 is connected in signal communication with an input of an error concealment module 177. An output of the error concealment module 177 is connected in signal communication with a third input of the motion compensator 160. The output of the deblock filter 190 provides the output of the video decoder 100.

In accordance with an embodiment of the present principles, denote $f_c$ as a missing frame and $f_r$ as its reference frame. Consider that $f_c$ is concealed by first estimating its motion field then followed by motion compensation, both based on $f_c$. The motion field of $f_r$ can be projected onto $f_c$ to recover its missing motion information according to the following general formula:

$$\begin{cases} MV_c^x(i+d_x(i,j), j+d_y(i,j)) = MV_r^x(i,j) \\ MV_c^y(i+d_x(i,j), j+d_y(i,j)) = MV_r^y(i,j) \end{cases} \quad (1)$$

where (i, j) are the coordinates of a pixel (or a block) in a frame, $(MV_c^x(i,j), MV_c^y(i,j))$ and $(MV_r^x(i,j), MV_r^y(i,j))$ are the motion vectors at position (i, j) of $f_c$ and $f_r$, respectively, and $(d_x(i,j), d_y(i,j))$ is the possible displacement caused by the projection.

In general, there are various ways to define the displacement to have a different "Motion Projection" (MP) algorithm. In an embodiment, one projection of interest is represented by the following form:

$$\begin{cases} d_x(i,j) = -MV_r^x(i,j) \\ d_y(i,j) = -MV_r^y(i,j) \end{cases} \quad (2)$$

In this form, the Motion Projection (MP) presumes that the motion remains constant along the motion trajectory. In contrast, Frame Copy (FC) presumes a stationary motion model, while MC presumes that the motion remains constant at any position from frame to frame. As is evident, the model taken by the MP is more realistic than those of FC and MC. However, in practice, due to the possible non-one-to-one mapping between the two motion fields by the MP, there may exist areas which have none or multiple coverages caused by the projection, which is not a problem in a pixel based scheme. Furthermore, sometimes the motion to be projected does not represent the true motion of a moving object. Thus, if applying the above referenced prior art block-level error concealment algorithm directly, such application may generate motion fields with undesired discontinuity, which compromises performance. Therefore, in accordance with the present principles, a motion projection scheme is described which addresses the associated problems of prior art, block-based error concealment.

The present principles utilize a block-based error concealment scheme. In general, as noted above, the present principles are applicable to any block-based video compression standard, although described herein for illustrative purposes with respect to an H.264 standard compliant bitstream.

For the finest possible granularity, the smallest motion block size allowed by the video compression standard in use should be utilized. Since 4×4 is the smallest block size supported by the H.264 standard, an embodiment of the present principles assigns a motion vector to each 4×4 block in a concealed frame (or, as noted above, a concealed field, picture, slice, and so forth may also be used, while still maintaining the scope of the present invention). Also, since multiple reference motion compensation is permitted in the H.264 standard, the motion vectors in a frame can have different reference indices. In the later stage (hereinafter referred to as the "post processing stage") of an implementation of the present principles, in order to fully utilize the spatial neighboring information, it is desirable that motion vectors and displacement are with respect to one reference frame. Thus, both motion vectors and displacement are rescaled (divided) by $R(f_c, f_r)$ if necessary, where $R(f_c, f_r)$ is the temporal distance between frame $f_c$ and $f_r$. Hereinafter, it is presumed that the scaling has been applied and all the motion vectors and displacement are with respect to the same reference frame.

In an embodiment, the scheme of the present principles may be divided into two stages: motion-projection; and post-processing. Denote $B_c$ as a 4×4 block in $f_c$ and $B_r$ as a block to be projected from $f_r$, where $B_r$ can be of any block size supported by the H.264 standard. Note that if $B_r$ is coded in intra mode, then the missing motion information for $B_r$ can be estimated from its neighbors by assigning it in SKIP_P mode. Before the projection, all the blocks $\{B_c\}$ in $f_c$ are initialized to not be covered by any projected block $B_r$. Considering all the possible outcomes, the following possible three states are defined for each $B_c$ after projection: (1) "covered state", when the block is covered by a unique, dominant projected block; (2) "conflict state", when the block is covered by multiple projected blocks with no dominant coverage; and (3) "non-covered state", when the block is not covered by any projected block.

Take a block $B_r$ from $f_r$, project it to $f_c$ and denote the projected block as $\hat{B}_r$. Let $\{B_c\}$ be the set of 4×4 blocks in $f_r$ that have non-zero overlapping areas with $\hat{B}_r$. For each $B_r$, a set of projection procedures is designed to assign the MV of $B_r$ to $\{B_c\}$. This set of procedures is depicted in FIG. 2.

Figure 2:
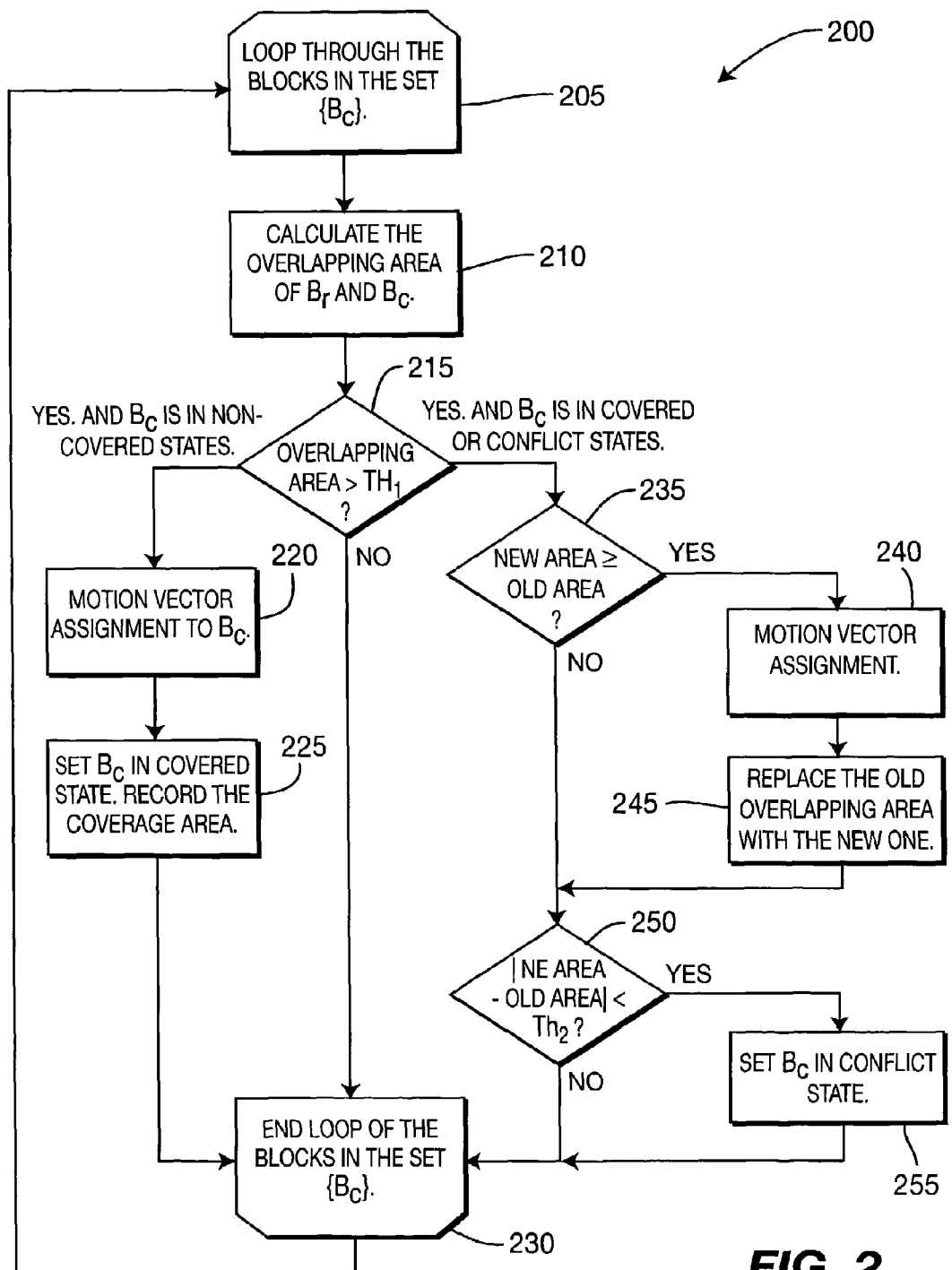
FIG. 2 is a flow diagram for an exemplary method for projecting a block in a video decoding process, according to an embodiment of the present principles.

Turning to FIG. 2, an exemplary method for projecting a block in a video decoding process is indicated generally by the reference numeral 200. The method 200 includes a loop limit block 205 that loops through the blocks in the set $\{B_c\}$, and passes control to a function block 210. The function block 210 calculates the overlapping area of $B_r$ to $B_c$, and passes control to a decision block 215. The decision block 215 determines whether or not the overlapping area is greater than a threshold $Th_1$. If so, then control is passed to a function block 220. Otherwise, control is passed to a decision block 235. It is to be appreciated that a "yes" result to the decision posed by decision block 215 corresponds to $B_c$ being in a covered state, while a "no" result corresponds to $B_c$ being in a covered state and/or conflict state.

The function block 220 assigns a motion vector to $B_c$, and passes control to a function block 225. The function block 225 sets $B_c$ to the covered state, records the coverage area, and passes control to a loop limit block 230. The loop limit block 230 ends the loop for the blocks in the set $\{B_c\}$, and returns control to the loop limit block 205.

The decision block 235 determines whether or not the new (overlapping) area is greater than or equal to the old (overlapping) area. If so, then control is passed to a function block 240. Otherwise, control is passed to a decision block 250.

The function block 240 assigns a motion vector to $B_c$ in $f_c$ (based on the projected block(s) Br from $f_r$ that overlaps $B_c$), and passes control to a function block 245. The function block 245 replaces the old overlapping area with the new one, and passes control to the decision block 250.

The decision block 250 determines whether or not the new area minus the old area is less than or equal to a threshold $Th_2$. If so, then control is passed to a function block 255. Otherwise, control is passed to the loop limit block 230.

The function block 255 sets $B_c$ to the conflict state.

As is evident, the MV for each 4×4 block in $f_c$ is assigned based on the projected block(s) Br from $f_r$ that overlaps the respective 4×4 block. For each 4×4 block, the reliability of its motion vector is represented by the coverage area of a projected block $B_r$. With a larger coverage area, the reliability becomes higher, and vice versa. On the other hand, if there are multiple projected blocks covering a 4×4 block, then the block is declared in the conflict state, which needs to be revisited at the second stage. This is also true for those 4×4 blocks that are not covered by any projected block from $f_r$.

Figure 3:
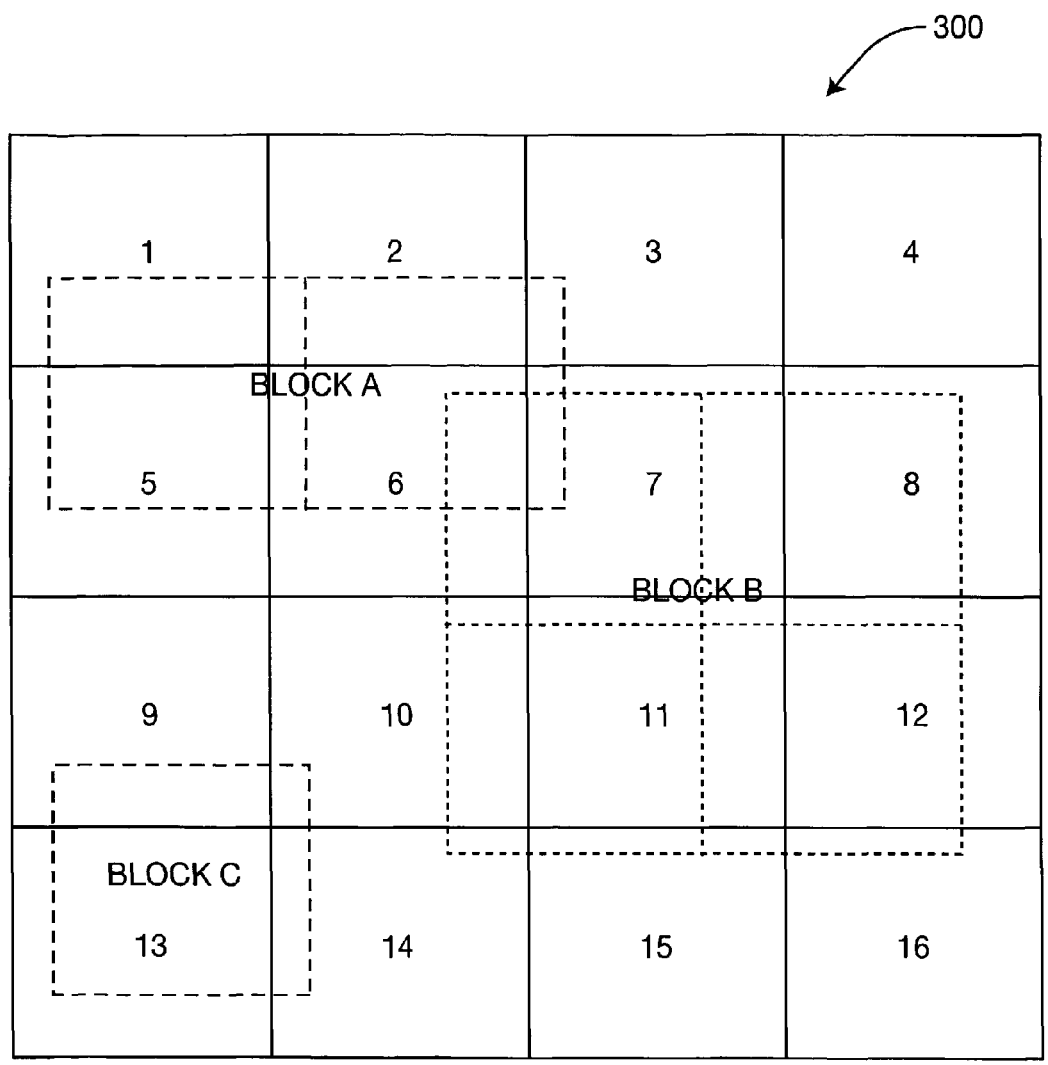
FIG. 3 is a diagram for an exemplary implementation of the method of FIG. 2, according to an embodiment of the present principles.

Turning to FIG. 3, an exemplary implementation of the method of FIG. 2 is indicated generally by the reference numeral 300. For instance, 4×4 blocks 8, 11, 12 are assigned the MV of block B because they are uniquely and dominantly covered by block B. Although block 7 is covered by both blocks A and B, block B takes the dominant coverage. Thus, block 7 is assigned the MV from block B. Meanwhile, although block 14 is covered partly by both blocks B and C, neither has a dominant coverage if the threshold $Th_1$ is set high. Thus, block 14 may be set to the non-covered state. Since there is no block projected onto block 4, block 4 is also set to the non-covered state.

After the above steps, if the total area covered by $\hat{B}_r$ is much smaller than its original size, then the projection is regarded as unsuccessful. An unsuccessful projection is likely to produce more non-covered or conflict areas in $f_c$ at the end of the projection stage. In order to solve the problem, when it happens, $B_r$ is projected with (0, 0) displacement. It is equivalent to applying "motion copy" to the block and it guarantees a full coverage area. The above procedure is applied to each block $B_r$ in $f_r$ to complete the motion-projection stage.

After the motion-projection stage, an estimate of the motion field of $f_c$ is constructed. However, the field may include areas with conflict or non-covered states. For those areas, there is either no associated motion vector or the associated motion vector is likely to be inaccurate, both of which can harm the concealment performance. Thus, a post-processing stage is provided in accordance with the present principles to address this problem.

In the post-processing stage, the motion vectors of those blocks with a conflict or non-covered state in $f_c$ are first re-estimated. The re-estimation is based on their spatially reliable neighbors using median filtering. More specifically, for a block with the above states, a median filter with a window size of 3×3 (in the unit of a 4×4 block) is applied. Only qualified neighbors of the block are selected into the filtering. A set of procedures is designed to perform the selection and filtering for each block to be filtered, which is described with respect to FIG. 4.

Figure 4:
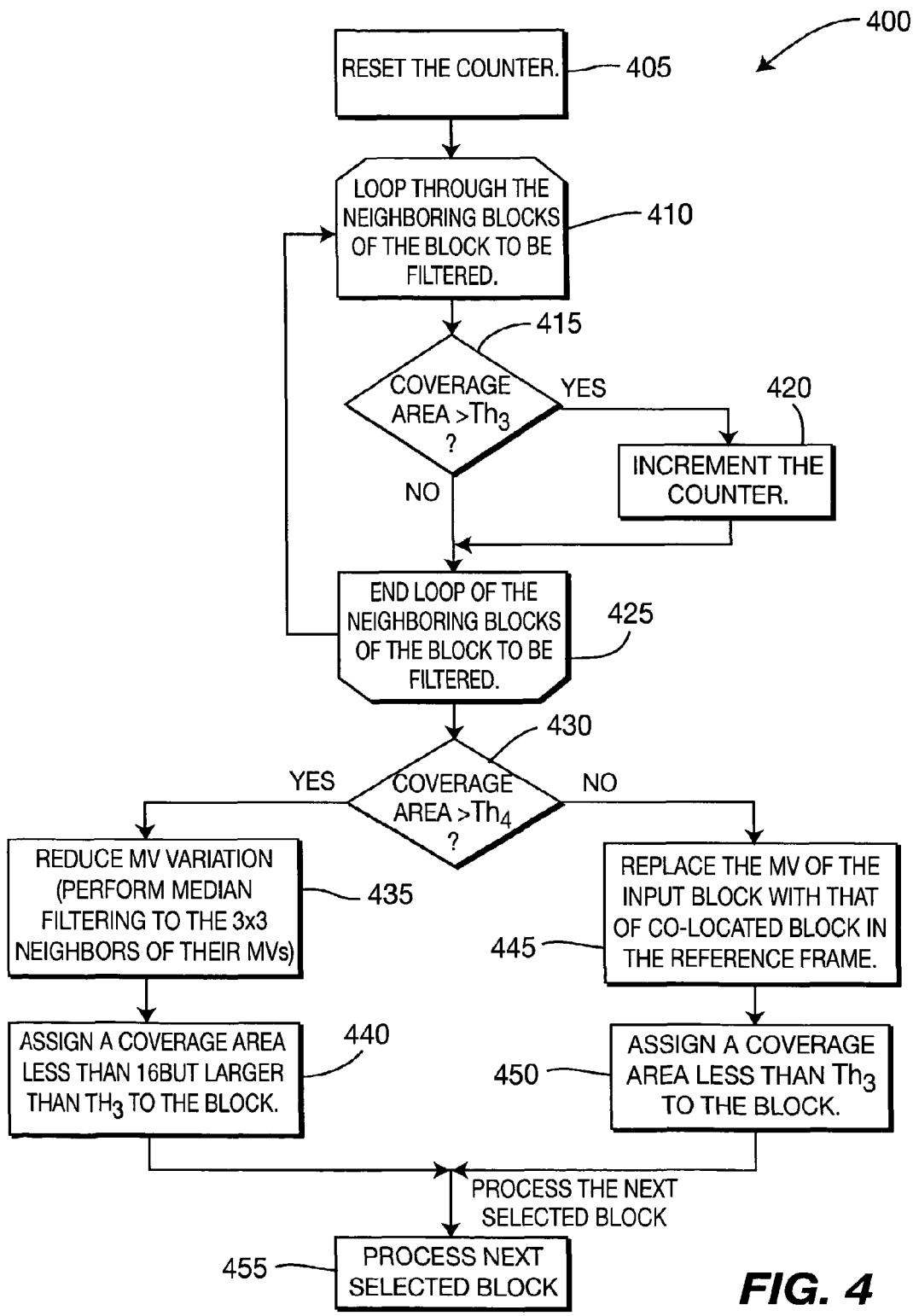
FIG. 4 is a flow diagram for an exemplary method for median filtering for non-covered and conflict areas of a missing video frame, according to an embodiment of the present principles.

Turning to FIG. 4, an exemplary method for median filtering for non-covered and conflict areas of a missing video frame is indicated generally by the reference numeral 400. The method 400 includes a function block 405 that resets a counter, and passes control to a loop limit block 410. The loop limit block 410 loops through the neighboring blocks of the block to be filtered, and passes control to a decision block 415. The decision block 415 determines whether or not the coverage area is less than a threshold $Th_3$. If so, then control is passed to a function block 420. Otherwise, control is passed to a loop limit block 425.

The function block 420 increments the counter, and passes control to the loop limit block 425. The loop limit block 425 ends the loop of the neighboring blocks of the block to be filtered, and passes control to a decision block 430. The decision block 430 determines whether or not a current value of the counter is greater than a threshold $Th_4$. If so, then control is passed to a function block 435. Otherwise, control is passed to a function block 445.

The function block 435 reduces variation in the motion vectors of the block and all its neighboring blocks (e.g., by performing median filtering with respect to the motion vectors of the block and all its neighboring blocks (e.g., in a 3×3 block region)), and passes control to a function block 440. The function block 440 assigns a coverage area less then 16 but larger than $Th_4$ to the block, and passes control to a function block 455 that processes the next selected block.

The function block 445 replaces the motion vector of the input block with that of the co-located block in the reference frame, and passes control to a function block 450. The function block 450 assigns a coverage area less than $Th_4$ to the block, and passes control to the function block 455.

After the above process, a more complete and reliable motion vector field is obtained. However, this motion vector field may include a significant amount of discontinuous areas which can result in annoying block artifacts after motion compensation if left untreated. To mitigate this problem, a spatial regularization process may be applied to the motion vector field. To avoid excessive blurring of the motion vector field, only selected areas are processed. Specifically, for example, only those 4×4 blocks which do not possess a full coverage area are filtered. From the above steps, these areas mostly correspond to the re-estimated blocks and the boundary of a moving object, where discontinuity mostly occurs. A median filter is chosen for the regularization due to its good compromise between complexity and performance. For each selected 4×4 area, a median filter with a window size of 3×3 (in the unit of a 4×4 block) is applied. This completes the post-processing stage.

After the motion-projection and post-processing stages, an estimation of the motion field of a lost frame is obtained. The motion information is then fed into a normal decoding process to reconstruct the lost frame.

Figure 5:
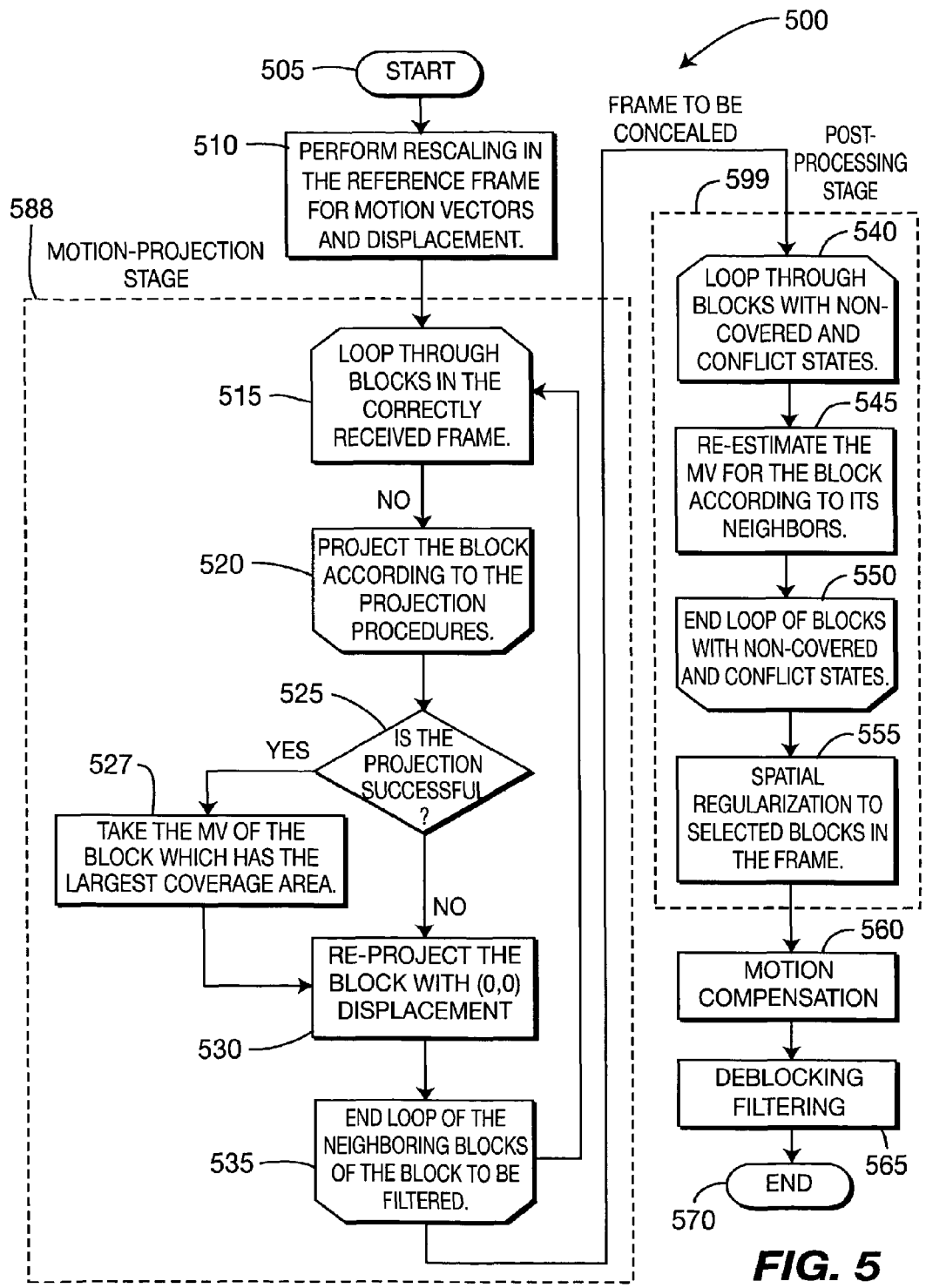
FIG. 5 is a flow diagram for an exemplary method for block-level error concealment in a video decoder, according to an embodiment of the present principles.

Turning to FIG. 5, an exemplary method for block-level error concealment in a video decoder is indicated generally by the reference numeral 500. It is to be appreciated that steps 515 through 535 relate to a motion-projection stage 588 of the method 500, while steps 540 through 555 relate to a post-processing state 599 of the method 500.

The method 500 includes a start block 505 that passes control to a function 510. The function block 510 performs rescaling in the reference frame for motion vectors and displacements, and passes control to a loop limit block 515. The loop limit block 515 loops through blocks in the correctly received frame, and passes control to a function block 520. The function block 520 projects the block according to the projection procedures, and passes control to a decision block 525. The decision block 525 determines whether or not the projection is successful. If so, then control is passed to a loop limit block 527. Otherwise, control is passed to a function block 530.

The loop limit block 527 takes the motion vector (MV) of the block which has the largest coverage area, and passes control to the function block 530.

The function block 530 re-projects the block with (0,0) displacement, and passes control the loop limit block 535. The loop limit block 535 ends the loop of blocks through the correctly received frame, returns control to the loop limit block 515, and also passes control to a loop limit block 540. The loop limit block 540 loops through blocks with non-covered and conflict states, and passes control to a function block 545. The function block 545 re-estimates the motion vector for the block according to its neighbors, and passes control to a loop limit block 550. The loop limit block 550 ends the loop through the blocks in the non-covered and conflict states, and passes control to a function block 555. The function block 555 performs spatial regularization to selected blocks in the frame, and passes control to a function block 560. The function block 560 performs motion compensation, and passes control to a function block 565. The function block 565 performs deblocking filtering, and passes control to an end block 570.

Different from other existing approaches, the approach in accordance with the present principles explicitly separates the MV projection and correction into two stages. In the motion projection stage, only the most reliable MVs are projected and assigned to the blocks in a concealed frame. In the post-processing stage, the MVs of selected blocks are re-estimated based on their spatially reliable neighbors. By separating the approach into two stages, only one MV needs be maintained for each block in a concealed frame each time. Together with the block-based architecture, most of the algorithm can re-use the existing data structures and functions in the decoder. Thus, embodiments of the present principles may use only a minimal amount of computation and implementation overhead, which is beneficial for applications with stringent real-time and complexity constraints.

As previously described, Frame Copy and Motion Copy are effective for video with stationary and consistent motion fields, respectively. The approach of the present principles presumes a more realistic motion model and, hence, can provide better error concealment performance for video with active and chaotic motion, at the expense of some complexity overhead. Thus, the scheme may be selectively invoked in practice. For example, in an embodiment, a procedure may be implemented to call the best error concealment schemes according to the characteristic of an input video. For example, an analysis of the motion field of a reference frame can be conducted before the error concealment. The statistics of the average magnitude, directions and their variances of the motion vectors are collected to determine if the motion is indeed chaotic compared to some predefined thresholds. If the reference frame presents little motion, then the simplest Frame Copy can be called. Meanwhile, Motion Copy can be used if the reference frame has a consistent motion field. Moreover, an embodiment in accordance with the present principles may be invoked for a scene with a chaotic motion field. Of course, other configurations and implementations of the present invention may be readily implemented by one of ordinary skill in this and related arts, given the teachings of the present principles provided herein, while maintaining the scope of the present principles.

A description will now be given of some of the many attendant advantages/features of the present invention, some of which have been mentioned above. For example, one advantage/feature is an apparatus for block-based error concealment. The apparatus includes an error concealment module for concealing a current block in a lost picture of a video sequence, by projecting positions of at least one block in a correctly received picture of the video sequence to a position of the current block in the lost picture using motion vectors of the at least one block in the correctly received picture so as to obtain a resultant projection, and selecting one of the at least one block in the correctly received picture based upon an amount of overlap in the resultant projection. The current block in the lost picture is then concealed using a motion vector of the selected one of the at least one block in the correctly received picture.

Another advantage/feature is the apparatus having the error concealment module as described above, wherein the at least one block in the correctly received picture includes a co-located block with respect to the current block in the lost picture and further includes spatially available neighboring blocks with respect to the co-located block, and the error concealment module reduces variation in motion vectors of the spatially available neighboring blocks in the correctly received picture in a post-processing stage subsequent to selecting the at least one block in the correctly received picture.

Yet another advantage/feature is the apparatus having the error concealment module that reduces the variation in the motion vectors of the spatially available neighboring blocks as described above, wherein the error concealment module applies a selective median filter to the motion vectors of the spatially available neighboring blocks to reduce the variation in the motion vectors.

Still another advantage/feature is the apparatus having the error concealment module as described above, wherein the at least one block in the correctly received picture includes a co-located block with respect to the current block in the lost picture and further includes spatially available neighboring blocks with respect to the co-located block, and the error concealment module reduces variation in motion vectors of the co-located block and the spatially available neighboring blocks in the correctly received picture in a post-processing stage subsequent to selecting the at least one block in the correctly received picture.

Moreover, another advantage/feature is the apparatus having the error concealment module that reduces the variation in the motion vectors of the co-located block and the spatially available neighboring blocks as described above, wherein the error concealment module applies a selective median filter to the motion vectors of the co-located block and the spatially available neighboring blocks to reduce the variation in the motion vectors.

Also, another advantage/feature is the apparatus having the error concealment module as described above, wherein the apparatus is used in a non-scalable, block-based video decoder, and the motion vector of the selected one of the at least one block in the correctly received picture is used in a motion compensation operation by the non-scalable, block-based video decoder.

Additionally, another advantage/feature is the apparatus having the error concealment module as described above, wherein the error concealment module scales the motion vector of the selected one of the at least one block in the correctly received picture based upon a relative temporal distance between the lost picture and the correctly received picture.

Moreover, another advantage/feature is the apparatus having the error concealment module as described above, wherein the error concealment module selectively performs a frame repeat operation in place of obtaining the resultant projection, based upon an amount of motion in the video sequence.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/ output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. A method for concealing a current block in a lost picture of a video sequence, comprising:
   projecting positions of at least one block in a correctly received picture of the video sequence to a position of the current block in the lost picture using motion vectors of the at least one block in the correctly received picture so as to obtain a resultant projection;
   selecting one of the at least one block in the correctly received picture based upon an amount of overlap in the resultant projection; and
   concealing the current block in the lost picture using a motion vector of the selected one of the at least one block in the correctly received picture,
   wherein the method is performed in a video decoder, and
   wherein the at least one block in the correctly received picture includes a co-located block with respect to the current block in the lost picture and further includes spatially available neighboring blocks with respect to the co-located block, and the method further comprises reducing variation in motion vectors of the spatially available neighboring blocks in the correctly received picture in a post-processing stage subsequent to selecting the at least one block in the correctly received picture.

2. The method of claim 1, wherein said reducing step comprises applying a selective median filter to the motion vectors of the spatially available neighboring blocks.

3. The method of claim 1, wherein said reducing step comprises applying a selective median filter to the motion vectors of the co-located block and the spatially available neighboring blocks.

4. A method for concealing a current block in a lost picture of a video sequence, comprising:
   projecting positions of at least one block in a correctly received picture of the video sequence to a position of the current block in the lost picture using motion vectors of the at least one block in the correctly received picture so as to obtain a resultant projection;
   selecting one of the at least one block in the correctly received picture based upon an amount of overlap in the resultant projection; and
   concealing the current block in the lost picture using a motion vector of the selected one of the at least one block in the correctly received picture,
   wherein the method is performed in a video decoder, and
   wherein the at least one block in the correctly received picture includes a co-located block with respect to the current block in the lost picture and further includes spatially available neighboring blocks with respect to the co-located block, and the method further comprises reducing variation in motion vectors of the co-located block and the spatially available neighboring blocks in the correctly received picture in a post-processing stage subsequent to selecting the at least one block in the correctly received picture.

5. A method for concealing a current block in a lost picture of a video sequence, comprising:
   projecting positions of at least one block in a correctly received picture of the video sequence to a position of the current block in the lost picture using motion vectors of the at least one block in the correctly received picture so as to obtain a resultant projection;
   selecting one of the at least one block in the correctly received picture based upon an amount of overlap in the resultant projection; and
   concealing the current block in the lost picture using a motion vector of the selected one of the at least one block in the correctly received picture,
   wherein the method is performed in a video decoder, and
   wherein the video decoder is a non-scalable, block-based video decoder, and the motion vector of the selected one of the at least one block in the correctly received picture is used in a motion compensation operation by the non-scalable, block-based video decoder.

6. A method for concealing a current block in a lost picture of a video sequence, comprising:
   projecting positions of at least one block in a correctly received picture of the video sequence to a position of the current block in the lost picture using motion vectors of the at least one block in the correctly received picture so as to obtain a resultant projection;
   selecting one of the at least one block in the correctly received picture based upon an amount of overlap in the resultant projection;
   concealing the current block in the lost picture using a motion vector of the selected one of the at least one block in the correctly received picture; and
   further comprising scaling the motion vector based upon a relative temporal distance between the lost picture and the correctly received picture,
   wherein the method is performed in a video decoder.

7. An apparatus for block-based error concealment, comprising:
   an error concealment module for concealing a current block in a lost picture of a video sequence, by projecting positions of at least one block in a correctly received picture of the video sequence to a position of the current block in the lost picture using motion vectors of the at least one block in the correctly received picture so as to obtain a resultant projection, and selecting one of the at least one block in the correctly received picture based upon an amount of overlap in the resultant projection,
   wherein the current block in the lost picture is concealed using a motion vector of the selected one of the at least one block in the correctly received, and wherein the at least one block in the correctly received picture includes a co-located block with respect to the current block in the lost picture and further includes spatially available neighboring blocks with respect to the co-located block, and said error concealment module reduces variation in motion vectors of the spatially available neighboring blocks in the correctly received picture in a post-processing stage subsequent to selecting the at least one block in the correctly received picture.

8. The apparatus of claim 7, wherein said error concealment module applies a selective median filter to the motion vectors of the spatially available neighboring blocks to reduce the variation in the motion vectors.

9. An apparatus for block-based error concealment, comprising:
an error concealment module for concealing a current block in a lost picture of a video sequence, by projecting positions of at least one block in a correctly received picture of the video sequence to a position of the current block in the lost picture using motion vectors of the at least one block in the correctly received picture so as to obtain a resultant projection, and selecting one of the at least one block in the correctly received picture based upon an amount of overlap in the resultant projection,
wherein the current block in the lost picture is concealed using a motion vector of the selected one of the at least one block in the correctly received picture, and
wherein the at least one block in the correctly received picture includes a co-located block with respect to the current block in the lost picture and further includes spatially available neighboring blocks with respect to the co-located block, and said error concealment module reduces variation in motion vectors of the co-located block and the spatially available neighboring blocks in the correctly received picture in a post-processing stage subsequent to selecting the at least one block in the correctly received picture.

10. The apparatus of claim 9, wherein said error concealment module applies a selective median filter to the motion vectors of the co-located block and the spatially available neighboring blocks to reduce the variation in the motion vectors.

11. An apparatus for block-based error concealment, comprising:
an error concealment module for concealing a current block in a lost picture of a video sequence, by projecting positions of at least one block in a correctly received picture of the video sequence to a position of the current block in the lost picture using motion vectors of the at least one block in the correctly received picture so as to obtain a resultant projection, and selecting one of the at least one block in the correctly received picture based upon an amount of overlap in the resultant projection,
wherein the current block in the lost picture is concealed using a motion vector of the selected one of the at least one block in the correctly received picture, and
wherein the apparatus is used in a non-scalable, block-based video decoder, and the motion vector of the selected one of the at least one block in the correctly received picture is used in a motion compensation operation by the non-scalable, block-based video decoder.

12. An apparatus for block-based error concealment, comprising:
an error concealment module for concealing a current block in a lost picture of a video sequence, by projecting positions of at least one block in a correctly received picture of the video sequence to a position of the current block in the lost picture using motion vectors of the at least one block in the correctly received picture so as to obtain a resultant projection, and selecting one of the at least one block in the correctly received picture based upon an amount of overlap in the resultant projection,
wherein the current block in the lost picture is concealed using a motion vector of the selected one of the at least one block in the correctly received picture, and
wherein said error concealment module scales the motion vector of the selected one of the at least one block in the correctly received picture based upon a relative temporal distance between the lost picture and the correctly received picture.

\* \* \* \* \*